UNITED STATES PATENT OFFICE.

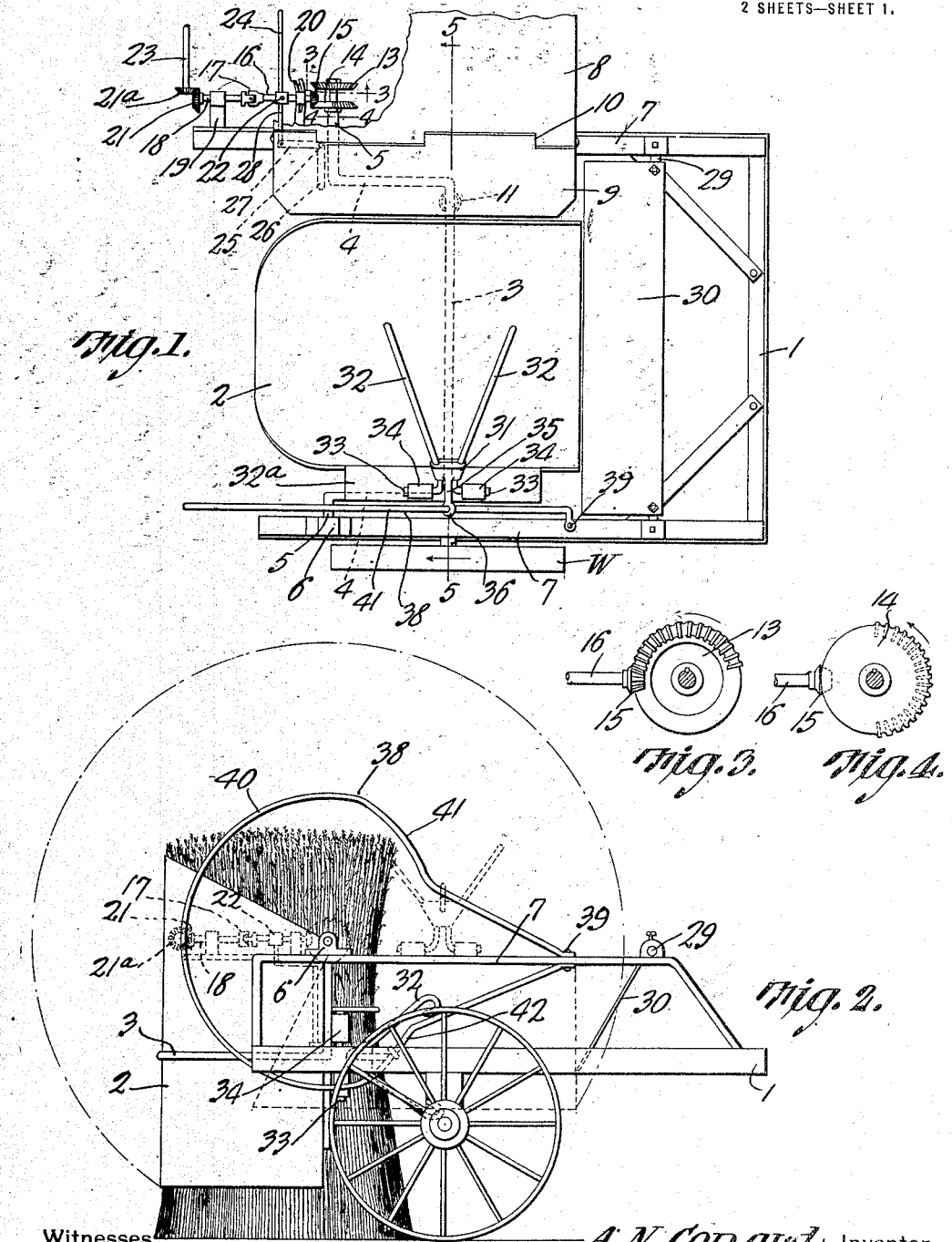

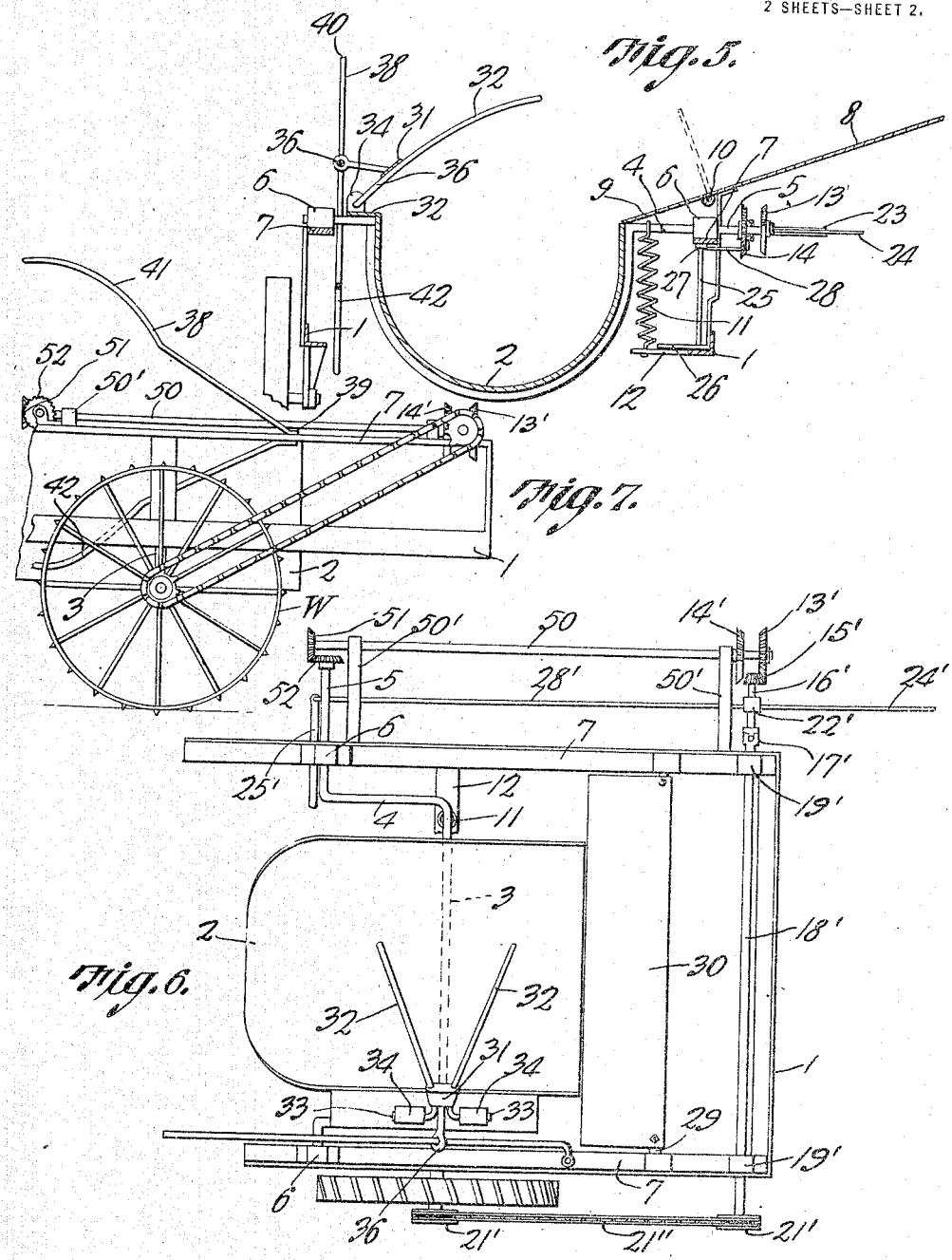

ABRAHAM NEFF CONARD, OF WEYBURN, SASKATCHEWAN, CANADA.

GRAIN-SHOCKER.

1,175,711.     Specification of Letters Patent.    Patented Mar. 14, 1916.

Application filed October 9, 1915. Serial No. 55,017.

*To all whom it may concern:*

Be it known that I, ABRAHAM NEFF CONARD, a citizen of the United States, residing at Weyburn, in the Province of Saskatchewan and Dominion of Canada, have invented a new and useful Grain-Shocker, of which the following is a specification.

The present invention appertains to grain shockers or stackers, and aims to provide a novel and improved attachment for a grain harvester, whereby the sheaves of grain are collected in shocks and then deposited upon the ground so that the shocking of the grain is accomplished automatically instead of by hand as usual.

The invention includes improved details of construction, to enhance the utility of the machine, the mechanism also being comparatively simple and inexpensive in construction, as well as being practical and efficient in operation.

With the foregoing and other objects in view which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawing, wherein:—

Figure 1 is a plan view of the mechanism with the parts in normal position, portions being broken away. Fig. 2 is a side elevation of the mechanism illustrating the cradle swung to position for depositing the shocks upon the ground. Figs. 3 and 4 are enlarged sectional details on the lines 3—3 and 4—4, respectively, of Fig. 1. Fig. 5 is a transverse section of the mechanism taken on the line 5—5 of Fig. 1. Fig. 6 is a fragmental plan view illustrating a modified form of driving gear. Fig. 7 is a fragmental elevation of the modified form.

In carrying out the invention, there is provided a frame 1 of U-shape in plan, as viewed in Fig. 1, with the opening disposed rearwardly, the frame lying in a horizontal plane, and one limb or side portion thereof being attached in any suitable manner to an ordinary grain harvester.

Mounted within the frame 1 is a concaved cradle or receptacle 2, constructed of sheet metal or other suitable material, and normally disposed in a horizontal position longitudinally within the frame. This cradle is trunnioned to the frame, and to this end a curved rod or saddle 3 is provided, the cradle being secured thereon, and the rod 3 has rearwardly projecting cranks 4 at the side edges of the cradle, and providing outturned trunnions 5 journaled in suitable bearings 6 carried by the frame. The bearings 6 are secured upon raised portions 7 of the frame carried by the limbs or side portions thereof. The trunnions 5 are located adjacent the rear ends of the limbs of the frame, and adjacent the rear end of the cradle 2.

The chute 8 for the sheaves of grain coming from the harvester, is secured upon the respective raised portion 7 of the frame, and a wing 9 is hinged, as at 10, to the lower or delivery end of the chute 8. The wing 9 normally swings downwardly into alinement with the chute 8 so as to extend to the respective upper or side edge of the cradle 2, the wing 9 normally resting upon the respective crank or portion 4 of the cradle saddle or carrier.

A coiled wire retractile spring 11 has one end connected to that crank 4 adjacent the harvester, and has its other end attached to an inwardly projecting arm 12 carried by the respective limb of the frame 1. This spring 11 holds the cradle 2 in normal horizontal position, and when the cradle is swung upwardly, rearwardly and downwardly, the spring holds the cradle in downwardly projecting vertical position, as seen in Fig. 2. In this connection it is to be noted that when the cradle is swung upwardly and rearwardly from its normal position beyond an intermediate position at which the respective crank 4 and spring 11 lie in the same plane, the spring will come into play for quickly swinging the cradle downwardly, and conversely, when the cradle is swung upwardly beyond said intermediate or "dead center" position, the spring comes into play for quickly returning the cradle to normal position.

As a means for actuating the cradle, that trunnion 5 adjacent the harvester is extended, and has secured thereon, a pair of spaced mutilated bevel gears 13—14, the teeth of which are normally arranged as illustrated in Figs. 3 and 4, when the cradle is in initial position. Disposed between the gears 13—

14 is a bevel pinion 15 carried by a swinging stub shaft 16 connected by a universal joint 17 with a shaft 18 journaled in a bearing 19 attached to the adjacent limb of the frame 1. The shaft 16 is guided for swinging movement by a suitable guide 20, and the pinion 15 is adapted to be swung between the gears 13—14 so as to alternately engage them. The shaft 18 has a bevel gear 21 meshing with a bevel gear 21ª secured to a driving shaft 23, which is any suitable shaft of the harvester mechanism, whereby the cradle is operated directly from the harvester. A rod, cord or other suitable element 24 is connected with a boxing or sleeve 22 embracing the shaft 16, whereby the operator occupying the harvester can pull the rod or element 24 to swing the pinion 15 into engagement with the gear 13 at the opportune moment, when the cradle 2 is filled with sheaves. A vertical shaft 25 is journaled to the respective limb and raised portion 7 of the frame, and is provided with a lower arm 26 and an upper arm 27, forming a bell crank lever. The upper arm 27 is connected by a link 28 with the sleeve 22, and the lower arm 26 lies in the path of the respective crank 4, whereby when the cradle is swung to downwardly projecting position, as seen in Fig. 2, the respective crank 4 swings the arm 26, and thereby pulls the link 28 to swing the pinion 15 into engagement with the gear 14, as illustrated in Fig. 1.

In order to support that portion of the frame remote from the harvester, the respective limb is carried by a ground wheel W which is connected in any suitable manner to that limb of the frame remote from the harvester.

In order to properly guide and hold the butts of the sheaves within the cradle 2, a transverse shaft 29 has its ends attached to the raised portion 7 in front of the cradle 2, and a depending wing 30 is attached to the shaft 29 and projects downwardly in front of the cradle, the wing 30 being held at any suitable angle, whereby the butts of the sheaves are guided properly into the cradle as the sheaves roll off of the chute 8 and wing 9. The wing 30 also prevents the sheaves from shifting forwardly out of the cradle.

In order to retain the sheaves of grain within the cradle during the time that the cradle is being swung, that is, to prevent the grain from being thrown out of the cradle during the swinging thereof, a fork or retaining member 31 having prongs 32 is pivoted upon an outturned flange 32ª projecting from that upper edge or side of the cradle 2 opposite the chute 8. The shank of the fork 31 has outturned fingers 33 journaled with a pair of bearings 34 secured upon the flange 32ª. This retaining fork 31 projects over the cradle 2, but is normally swung upwardly out of the way, to allow the sheaves to roll into the cradle without interference.

In order to control the movements of the fork 31, the shank thereof is provided with an outstanding arm 35 having an eye 36 engaging or loosely embracing a cam rod 38. The rod 38 is bent into loop-form, and has its ends secured, as at 39, to the raised portion 7 which is remote from the harvester. The bend of the rod 38 is bent on a curve, as at 40, having the respective trunnion 5 as a center, said curved portion 40 extending through an arc of slightly over 180 degrees, and the limbs of the rod 38 are provided at the ends of the portion 40 with inwardly curved cam portions 41—42 at the top and bottom of the cam rod. When the cradle is in normal position, the eye 36 is slid upon the cam portion 41, and this serves to swing the fork 31 upwardly away from the cradle so that the free end of the fork is spaced from the receiving edge of the cradle, as illustrated in Fig. 5. This allows the sheaves to roll from the chute 8 over the wing 9 into the cradle without interference. Now, when the cradle is swung upwardly, the fork is carried with the cradle, and the eye 36 being slid from the portion 41 onto the portion 40 will swing the fork toward the cradle, so that the fork holds the sheaves tightly within the cradle. The eye 36 then moving along the portion 40, will hold the fork stationary relative to the cradle, to prevent the sheaves being thrown from the cradle. When the cradle reaches the discharging position, as illustrated in Fig. 2, the eye 36 moves upon the cam portion 42, and this swings the fork 31 away from the cradle again, to liberate the shock and allow the same to be deposited or dropped upon the ground.

In operation, assuming that the parts are in normal position, the sheaves of grain will roll from the chute 8 over the wing 9 into the cradle, and will accumulate within the cradle, to form the shock. When the shock is formed, the operator pulls the rod or element 24, to bring the pinion 15 into mesh with the teeth of the gear 13, and the pinion 15 which is continually rotated when the harvester is in operation, will therefore rotate the gear 13 in the direction of the arrow in Fig. 3, which will swing the cradle upwardly and rearwardly beyond the intermediate or "dead center" position, in which event the teeth of the gear 13 are disengaged from the pinion 15. The spring 11 now comes into play for swinging the cradle quickly to downwardly projecting position, as illustrated in Fig. 2 whereby the shock is brought to upright position. When the cradle 2 is swung upwardly, as above indicated, the crank 4 swings the wing 9 upwardly, and said wing is held raised by the respective crank 4. This allows the crank 4 to pass the wing 9. Furthermore, when the crank is swung from its normal to discharging position, the retaining fork 31 is swung for the reasons above given, to hold the shock within the cradle during the time that the cradle is being rotated, but when the cradle reaches the discharging position, the fork 31 is swung away from the cradle to release the shock and allow it to drop onto the ground. When the cradle is swung to discharging position to liberate the shock, the respective crank 4 swings the bell crank lever 25—26—27, whereby the pinion 15 is pulled or moved away from the gear 13 and into mesh with the teeth of the gear 14. It will be understood that the gear 14 has previously rotated through an arc of about ¼ of a circle in the direction of the arrow Fig. 4, so that when the pinion 15 is swung into engagement with the gear 14, the gear 14 is rotated clockwise as viewed in Fig. 4, to swing the cradle rearwardly and thence upwardly. When the cradle is swung upwardly beyond the intermediate or "dead center" position, the spring comes into play for quickly returning the cradle to normal position, it being noted that the wing 9 can swing upwardly to allow the crank 4 to pass the same upon the returning movement of the cradle. As soon as the cradle is moved upwardly beyond the intermediate position by the engagement of the pinion 15 with the gear 14, the teeth of the gear 14 will leave the pinion 15, so that the connection between the cradle and driving shaft 23 is broken to allow the spring 11 to return the cradle to initial position. The cradle is now brought to original position, for again receiving the sheaves from the chute 8.

The only thing that is necessary for the operator to do, is to pull the rod or element 24 at the proper time when he observes that the cradle is filled with sheaves, the operation otherwise being entirely automatic. Particular attention is directed to the fact that the cradle is trunnioned adjacent its rear end, and that the cradle is swung upwardly, rearwardly and thence downwardly to bring the butts of the sheaves onto the ground, the butts being forwardly when the sheaves roll from the chute 8 into the cradle. This brings the shock into proper position upon the ground, and when the cradle returns to normal position, the upper end, as seen in Fig. 2, will readily pass over the shock, while the lower or free end will swing away from the shock and then pass over the same, as the machine moves forwardly. In this manner, the cradle moves snugly over the top of the shock in a curved line, and the cradle will therefore steady the shock after it is deposited upon the ground, and hold the shock in position so that it will n ' fall over.

The present mechanism is operable for collecting the sheaves as they are discharged from the harvester, and for depositing the accumulated sheaves in shocks or stacks at suitable intervals. This does away with considerable manual labor.

Figs. 6 and 7 illustrate a modified form of driving mechanism. In this form, the ground wheel W is utilized for actuating the cradle. Thus, a transverse counter shaft 18' is journaled in bearings 19' carried by the frame and adjacent the forward end thereof, and sprocket wheels 21' are attached to the wheel W and respective end of the shaft 18' and have a sprocket chain 21'' trained therearound, to connect the shaft 18' with the wheel. A stub shaft 16' is connected by a universal joint 17' with the other end of the shaft 18', and has a bevel pinion 15' between a pair of mutilated gears 13'—14' secured upon a longitudinal shaft 50 journaled in bearings or brackets 50' attached to the inner limb of the frame. A bevel gear 51 carried by the shaft 50 meshes with a bevel gear 52. Secured to the inner trunnion 5, and a sleeve 22' upon the shaft 16' is connected by a link 28' with a lever 25' operated by the respective crank 4 of the cradle carrier or saddle. A rod, cable or equivalent element 24' is connected to the sleeve 22', whereby the operator can pull the pinion 15' into engagement with the gear 13', while the lever 25' when operated by the respective crank 4, moves the pinion 15' into engagement with the gear 14'. The parts 13', 14', 15', 16', 17', 18', 22', 24', 25', and 28', represent the parts of the first form having the same numerals without the prime mark exponents, so that the operation of the modified form will be readily understood, it being evident, that in this case, the carrier is operated not from the harvester, but from the wheel W. The resistance offered by the wheel W will thus counterbalance the drag created by the cutter device of the harvester at the opposite side, so that this will equalize the tendency of the harvester being twisted out of its path.

A salient feature of the invention resides in the fact that when the cradle is pulled downwardly by the spring, the cradle is given a quick downward and forward movement, and when the movement of the cradle is stopped, the shock is thrown with considerable momentum onto the ground, whereby the sheaves will settle firmly in position, and this will prevent the shock from tumbling over.

Having thus described the invention, what is claimed as new is:

1. A grain shocker embodying a trunnioned cradle for receiving the sheaves from a harvester, spring means for swinging the cradle to either normal or discharging position from an intermediate position, and means for swinging the cradle from normal and discharging position beyond the intermediate position.

2. A grain shocker embodying a frame, a cradle for receiving the sheaves from a harvester, a cradle carrier having cranks forming trunnions journaled to the frame, a spring connecting one crank and said frame and arranged to pull the cradle either to normal or discharging position from an intermediate position, and means for swinging the cradle from normal and discharging position beyond said intermediate position.

3. A grain shocker embodying a frame, a cradle, a cradle carrier having cranks providing trunnions journaled to the frame, a spring connecting one crank and said frame for moving the cradle to normal or discharging position from an intermediate position, means for swinging the cradle from normal and discharging position beyond said intermediate position, a chute, and a wing hinged to the lower end of said chute and normally extending to one edge of the cradle to be supported by the respective crank, said wing being swung upwardly by the crank when the cradle is swung.

4. A grain shocker embodying a frame, a cradle trunnioned adjacent one end to the frame to swing from a normal horizontal position upwardly, rearwardly and downwardly through ¾ of the circle, a retainer pivoted to one side of the cradle, and a loop-shaped cam having its ends secured to the frame, the retainer having a portion slidably engaging said cam, the cam having a portion extending through an arc of approximately 180 degrees about the respective trunnion of the cradle as a center, and said cam having inwardly curved cam portions at the end of said curved portion, whereby when the cradle is in normal and discharging position, the retainer is swung away from the cradle, and when the cradle is being swung from normal to discharging position, the retainer is swung toward the cradle for holding the sheaves therein.

5. A grain shocker embodying a cradle trunnioned adjacent one end to swing from a horizontal position through ¾ of a circle to a depending position, spring means for swinging the cradle to horizontal or depending position from an intermediate position, means for retaining the sheaves within the cradle when it is being swung from horizontal to depending position, and means for swinging the cradle from horizontal and depending position beyond said intermediate position.

6. A grain shocker embodying a frame, a cradle, a cradle carrier having cranks providing trunnions journaled to the frame, said trunnions being arranged adjacent one end of the cradle, the cradle being normally in a horizontal position and being adapted to swing through ¾ of a circle to a depending position, means for holding the sheaves within the cradle when the cradle is being swung from horizontal to depending position, a spring connecting one of said cranks and frame for swinging the cradle to horizontal or depending position from an intermediate position, and means for swinging the cradle from horizontal and depending position beyond said intermediate position.

7. A grain shocker embodying a swinging cradle, spring means for swinging said cradle from an intermediate position to either normal or discharging position, and an actuating mechanism for said cradle embodying a driving member, reversing means for operatively connecting said driving member and cradle, said reversing means being operable to swing the cradle from normal or discharging position beyond an intermediate position and then disconnecting the driving member and cradle, and means operated when the cradle is swung to discharging position for actuating the reversing means so that the cradle is automatically swung back beyond said intermediate position.

8. A grain shocker embodying a swinging cradle, means for retaining the sheaves therein when the cradle is being swung from normal to discharging position, a pair of mutilated gears connected to the cradle, a driving pinion between said gears and alternately engageable therewith, means for moving the pinion into engagement with one of said gears whereby the cradle is swung from normal position beyond an intermediate position in which event the pinion disengages the teeth of said gear, means operated when the cradle is swung to discharging position automatically moving the pinion into engagement with the other gear whereby the cradle is swung from discharging position beyond said intermediate position in which event the pinion is disengaged from the teeth of the last mentioned gear, and spring means for swinging the cradle from intermediate position to either normal or discharging position.

9. A grain shocker embodying a frame, a cradle within the frame, a cradle carrier having cranks providing trunnions journaled to the frame, a retainer carried by the cradle, means for moving the retainer away from the cradle when it is in normal and discharging position and for swinging the retainer toward the cradle when it is being swung from normal to discharging position, a spring connecting one of said cranks and said frame for swinging the cradle from an intermediate position to either normal or discharging position, a pair of mutilated gears connected to one of said trunnions, a driving pinion between and alternately engageable with said gears, means for moving the pinion into engagement with one gear whereby the cradle is swung from normal position beyond said intermediate position in which event said pinion is disengaged from the teeth of said gear, and a lever carried by the frame and operatively connected with said pinion and adapted to be operated by one of said cranks when the cradle is swung to discharging position so that the pinion is moved into engagement with the other gear to swing the cradle from discharging position beyond said intermediate position in which event said pinion is disengaged from the teeth of the second mentioned gear.

10. A grain shocker embodying a cradle adapted to be swung from a horizontal position through $\frac{3}{4}$ of a circle to a depending position, spring means for swinging the cradle downwardly with a quick motion, and means for swinging the cradle from normal position to bring said spring means into action.

11. A grain shocker embodying a cradle trunnioned adjacent one end and adapted to swing from a forwardly projecting position through $\frac{3}{4}$ of a circle to a depending position, means for retaining the sheaves within the cradle while it is being swung, means for swinging the cradle upwardly and rearwardly from normal position, and spring means for swinging the cradle by a quick motion downwardly and forwardly to deliver the shock onto the ground.

In testimony that I claim the foregoing as my own, I have hereto affixed my signature in the presence of two witnesses.

ABRAHAM NEFF CONARD.

Witnesses:
IVY E. SIMPSON,
MONROE E. MILLER.